Sept. 19, 1967 L. BRUGLEMANS 3,343,091

DIPHASE TRANSMISSION SYSTEM WITH NOISE PULSE CANCELLATION

Filed June 5, 1964 5 Sheets-Sheet 1

FIG. 1 DIPHASE TRANSCEIVER

INVENTOR.
Lucas Bruglemans

BY C. A. Bullbrandsen
ATTY.

Sept. 19, 1967 L. BRUGLEMANS 3,343,091

DIPHASE TRANSMISSION SYSTEM WITH NOISE PULSE CANCELLATION

Filed June 5, 1964 5 Sheets-Sheet 3

Sept. 19, 1967 L. BRUGLEMANS 3,343,091

DIPHASE TRANSMISSION SYSTEM WITH NOISE PULSE CANCELLATION

Filed June 5, 1964 5 Sheets-Sheet 5

United States Patent Office 3,343,091
Patented Sept. 19, 1967

3,343,091

DIPHASE TRANSMISSION SYSTEM WITH NOISE PULSE CANCELLATION

Lucas Bruglemans, Antwerp, Belgium, assignor to Automatic Electric Laboratories, Inc., Northlake, Ill., a corporation of Delaware Filed June 5, 1964, Ser. No. 372,993
5 Claims. (Cl. 325—320)

ABSTRACT OF THE DISCLOSURE

Diphase data transmission within a communication switching office at 20,000 bits per second using a modulation technique in which each signal cycle is either in phase or out of phase with the preceding cycle. The demodulator derives timing and data information from the signal, using squaring and differentiating circuits to derive a train having one or two pulses per data bit depending upon the binary value thereof. An integrating circuit measures the time between pulses to distinguish the 1 and 0 binary bits to generate the data signals. Gating these with the pulse train leaves one pulse per data bit for timing information. Each transceiver has a modulator and demodulator coupled to a two-conductor line by transformer windings in series. A transmit-receive switch arrangement shunts the demodulator transformer during sending to reduce its impedance to a low value.

Figure 1:
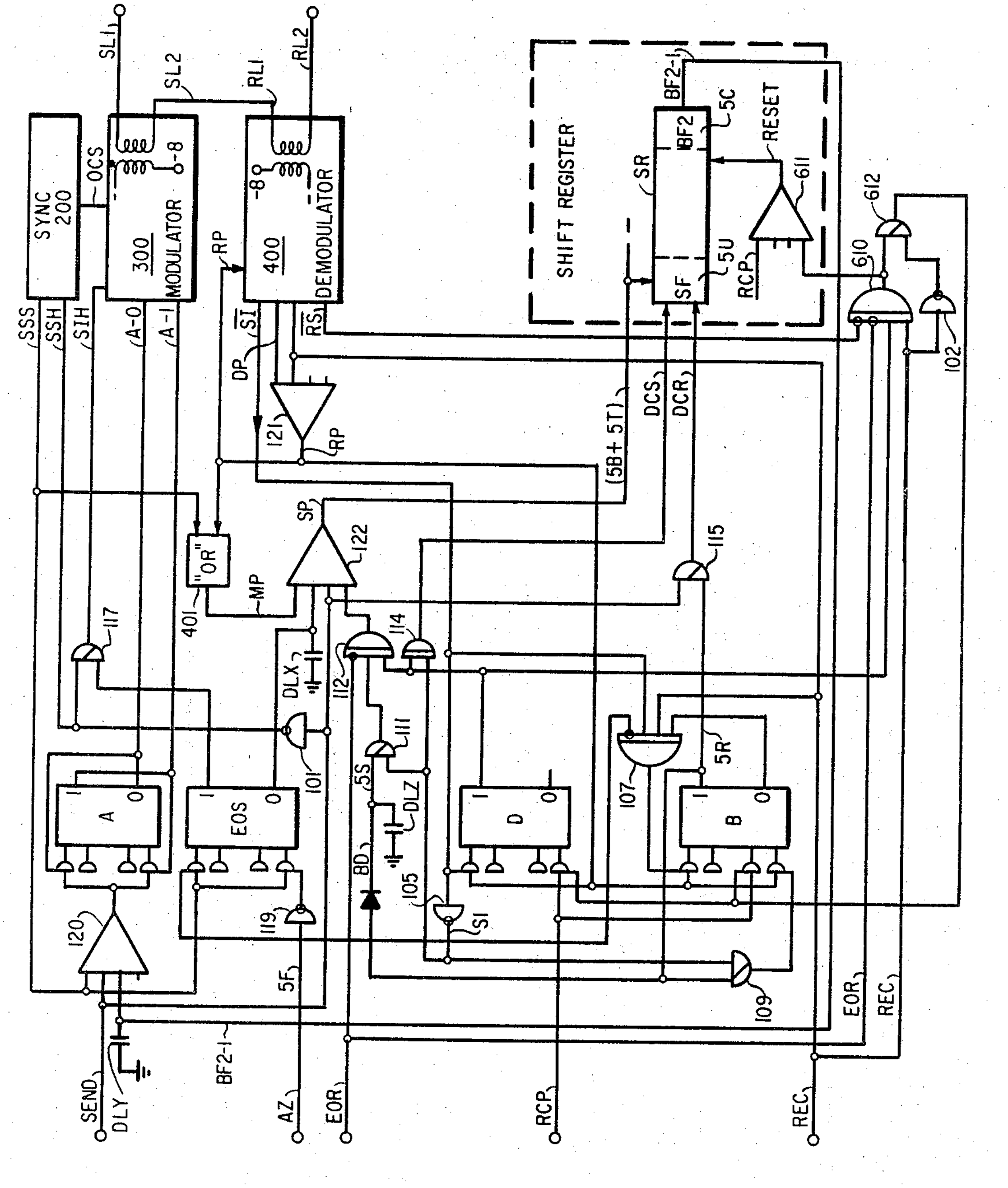

This invention relates to a diphase transmission system, and more particularly to a system in which a carrier signal is phase shift modulated by digital information in a binary system of notation, in which each binary digit is represented by a single cycle at the carrier frequency, with one binary value represented by a phase reversal at the beginning of a cycle, and the other binary value represented by a continuation of the same phase as the preceding cycle.

A copending United States patent application Serial No. 352,912, filed March 18, 1964 by W. R. Wedmore for a Diphase Transmission System discloses an arrangement for transmitting binary digits between common control equipment and markers in a communication switching exchange accurately and at high speed so as not to materially add to the holding time of the markers and common control equipment.

The demodulator comprises a low pass filter having a cutoff frequency substantially above the carrier frequency for removing components of the signal at the phase reversal points which fall near the zero amplitude level, followed by an arrangement for detecting signals exceeding a threshold value in both the positive and negative direction, squaring the detected signals, and differentiating them to produce a train of pulses representing the zero crossings of the received signal as it appears at the output of the filter, so that for each binary digit one pulse is produced if the digit has a first value and two pulses are produced for a second value. These pulses are then supplied to an arrangement for measuring the time between pulses by an integrator which actuates a switching device whenever the time between pulses is more than one-half cycle, the output of this switching device therefore being a signal decoding a binary digit of the first value. A decoded signal representing binary digits of the other value is derived from the output of the switching device and the pulse train. The timing synchronization pulse train is derived from the pulse train produced by the differentiators by gating it with the decoded signals of all of the binary digits of both the first and second value. This provides a simple and effective arrangement for both decoding the received signals and obtaining the timing synchronization signals.

A flip-flop is provided to obtain the decoded digit of the second value whenever the output switching device of the integrator does not produce a digit of the first value, by using the two pulses in the pulse train from the differentiator to first set and then reset the flip-flop, with the flip-flop remaining reset whenever the digit is of the first value.

The object of the present invention is to provide an arrangement to reduce the demodulator's susceptibility to noise pulses on the transmission line.

According to the invention, the demodulator includes an additional integrator for measuring the time between the differentiator output pulses, to generate a reset signal when the time between pulses is greater than one cycle. Since an actual signal has a maximum time between pulses of one cycle, this arrangement effectively guards against false operation produced by single or scattered noise pulses.

Figure 2:
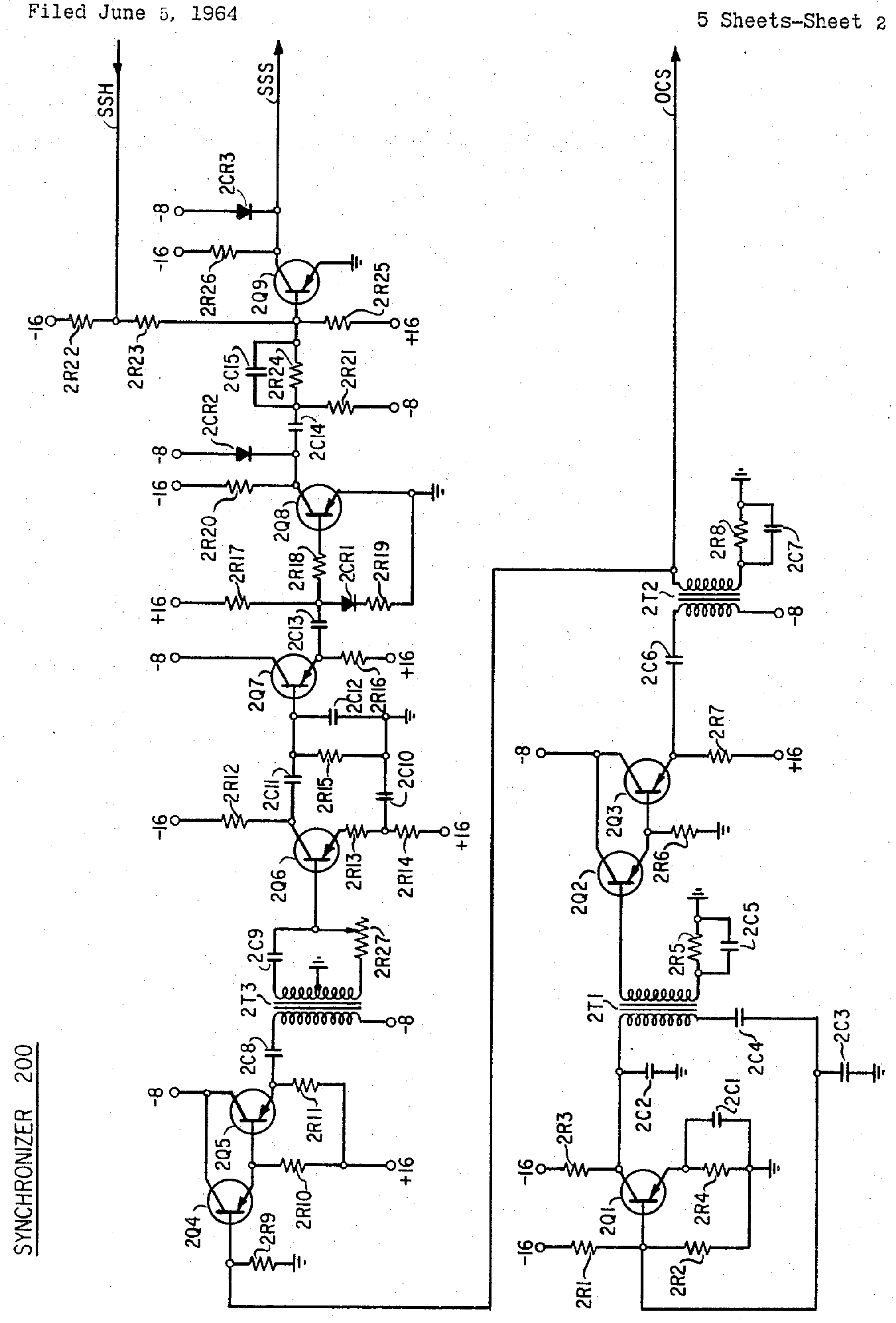
Figure 3:
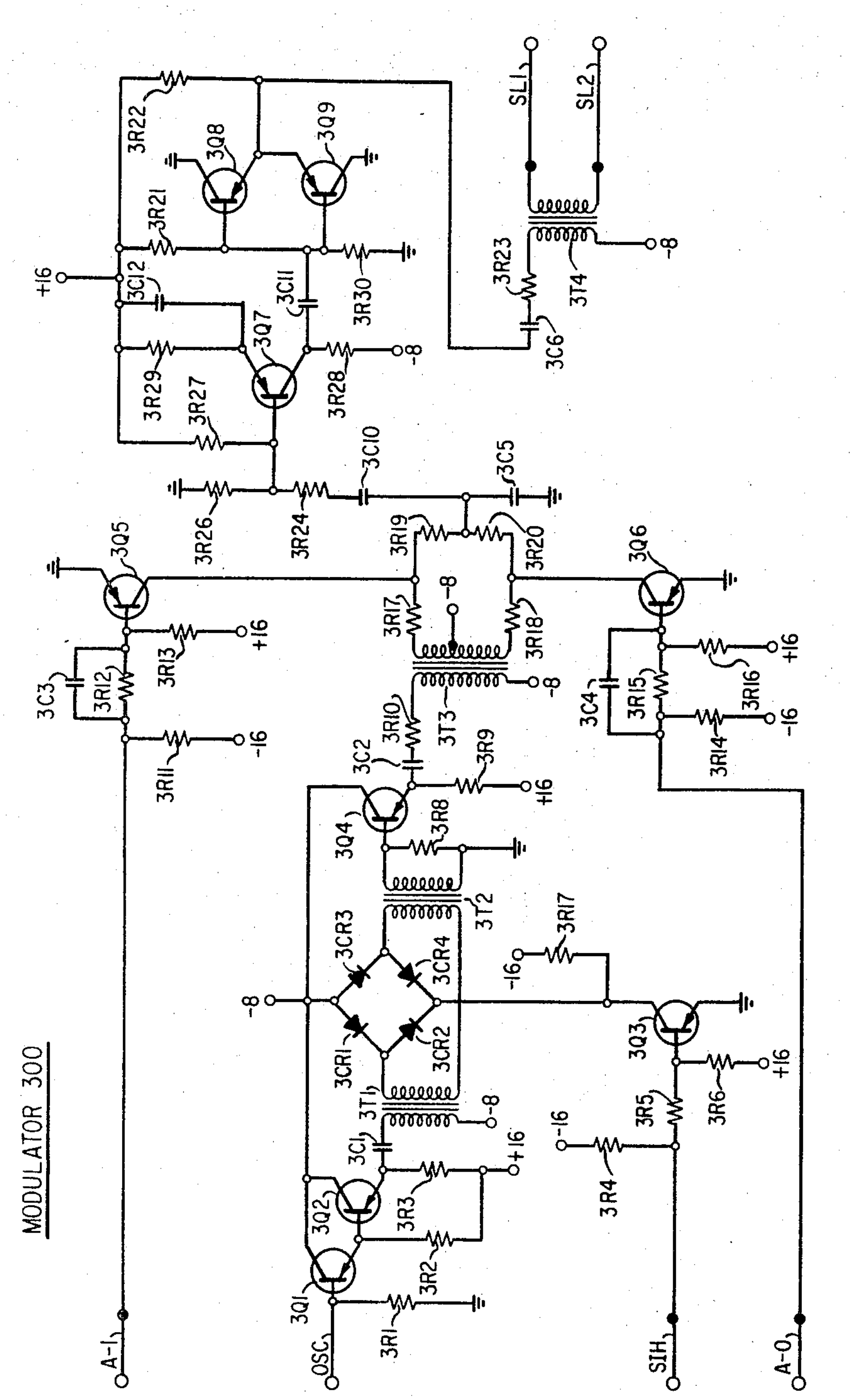
Figure 4:
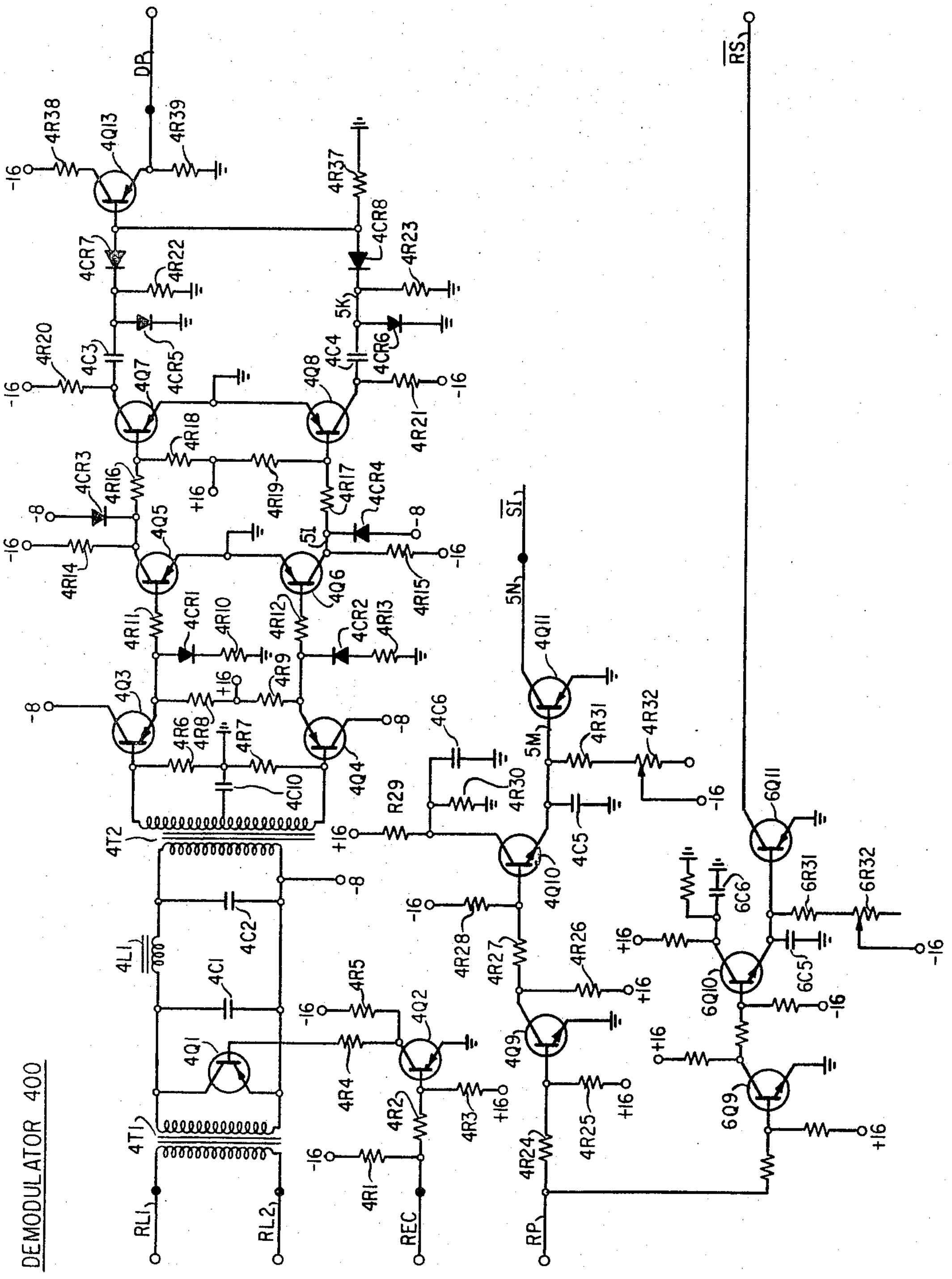
Figure 5:
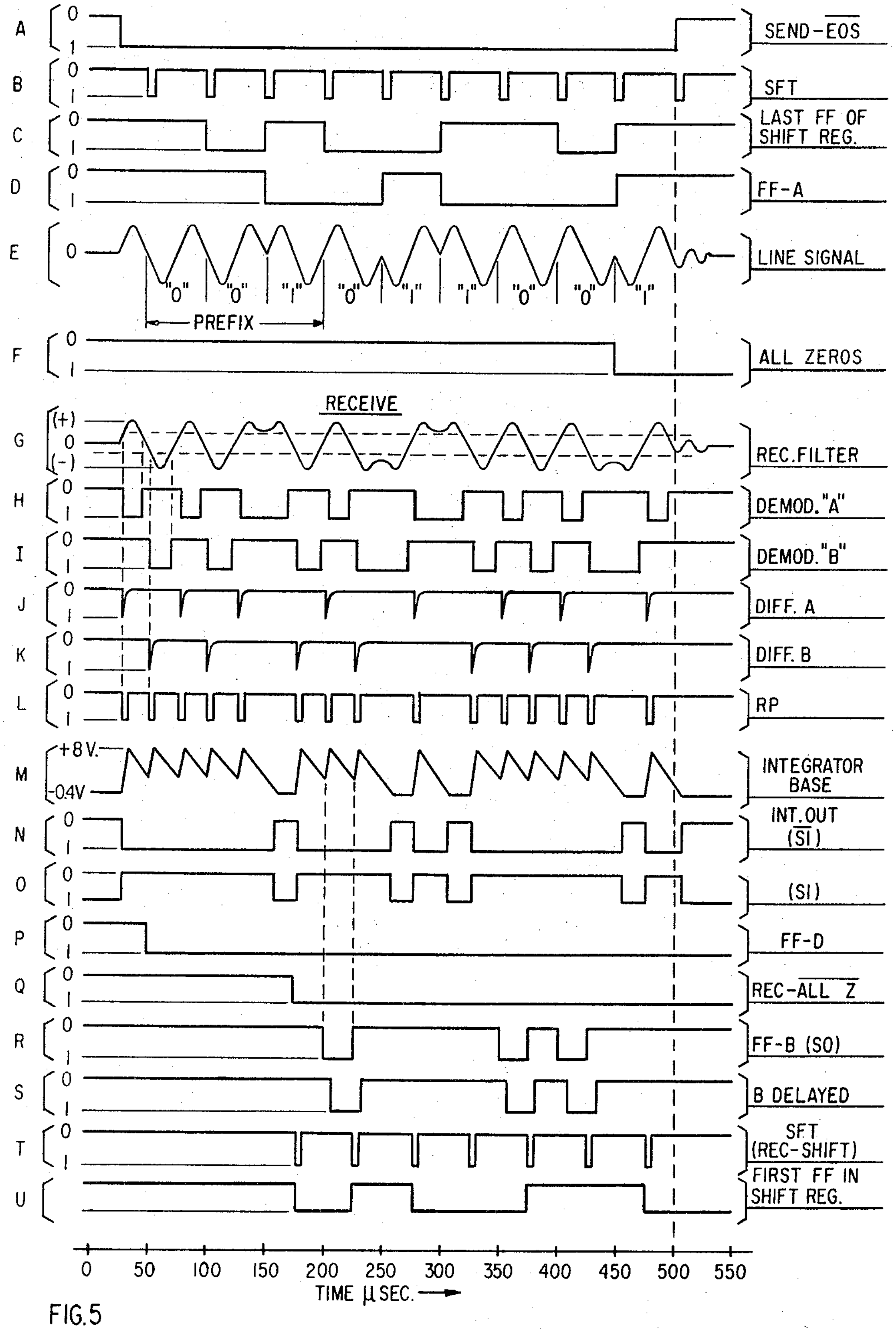

The above-mentioned and other objects and features of this invention and the manner of attaining them will become more apparent and the invention itself will be best understood, by reference to the following description of embodiments of the invention taken in conjunction with the accompanying drawings comprising FIGS. 1 to 5, wherein:

FIG. 1 is a functional block diagram of a diphase transceiver;

FIGS. 2, 3, and 4 are respectively schematic diagrams of a synchronizer, a modulator, and a demodulator of the diphase transceiver of FIG. 1;

FIG. 5 is a timing chart showing the signals at various points of the transceiver and on the transmission line for both sending and receiving.

*Logic symbolism*

Electronic logic circuits used in the system described herein employ as standard building blocks NOR gates, inverters, flip-flops, and gated pulse amplifiers among others.

Each of the flip-flops includes two transistors in a bistable circuit configuration. Each flip-flop is provided with four coincidence gates for inputs, either one of the first two being used to set the flip-flop, and either one of the other two being used to reset the flip-flop. Each coincidence gate has an A.C. input and a D.C. input and requires coincidence of these two inputs to effect a change of state of the flip-flop. The A.C. inputs are usually supplied with a train of recurring pulses from a clock source via a gated pulse amplifier. Each input coincidence gate of a flip-flop is arranged with a priming time so that the D.C. input must be present for this period of time before the A.C. input will be effective. This priming time along with the switching and transmission delays in the circuits provides an arrangement in which a change of state of a flip-flop produced by one A.C. input pulse is not effective at the D.C. inputs of the same or other flip-flops to produce another change of state until receipt of the next clock pulse.

Gated pulse amplifiers are transistor circuits having a direct coupled gating input arrangement and a capacitively coupled trigger pulse input terminal. When the two inputs coincide an output pulse is produced. The direct coupled gating is controlled via three input terminals and is effective when the first two of these inputs are true in coincidence, or the other input is true. Thus each gated pulse amplifier has four inputs and are always shown such that the upper input is the pulse input, the next two inputs are direct coupled coincidence inputs, and the last is a single direct coupled input. The direct coupled inputs are so arranged that if one of the coincidence control inputs is not used the other is effective when true and not effective when false, and if the single direct coupled input is not used it is not effective.

The logical gates are implemented with NOR gates, each of which is a one transistor logical element whose output can either be considered an AND function of the negation of its inputs, or it can be considered as an OR function of its inputs followed by an inversion. Therefore, the AND gates and the OR gate shown throughout the system are implemented with NOR gates. The electronic units are shown in the drawings as having any number of inputs and output loads, but in actual implementation these would be limited by loading requirements well known in the art.

A typical schematic diagram of these circuit elements is illustrated in said Wedmore patent application.

Except for the clock pulses used for triggering at the A.C. inputs of the flip-flops and gated pulse amplifiers, the logic circuits in the system are direct coupled, that is, signals are represented by steady-state voltages. Two levels are employed. The first level is usually −8 volts, although other negative values may be used, and represents the binary 1, true, on or active condition. The second level, ground potential, represents the binary 0, false, off or inactive condition. The flip-flops are used as registers with double-rail output signals to drive the logic circuits. A double-rail output is one in which both the logical 1 and 0 conditions are represented by active signals on separate leads. Only one of the two leads, however, has an active signal at any time. In the actual implementation most of the flip-flops and gate circuits are arranged such that the negative bias potential is provided at the input terminals of the gates and the D.C. inputs of the flip-flops, and this serves as the bias potential for the outputs of the preceding circuits. For the false condition, the flip-flops and gates provide a low resistance path to ground via a saturated transistor, and this ground potential is thereby applied at the inputs of the succeeding circuits.

In describing the logical operations performed by the circuits, Boolean algebra equations are used. In this notation the addition symbol signifies OR, the multiplication symbol, expressed or implied, signifies AND, and overlining signifies the inverted condition.

*Diphase transceiver (FIGS. 1–5)*

Referring to FIG. 1, the diphase transceiver comprises a synchronizer 200, a modulator 300, a demodulator 400, four flip-flops A, EOS, D and B and several logic gates. The transceiver operates in conjunction with a shift register SR.

The synchronizer 200 supplies a sine wave signal on lead OCS to the modulator, and a pulse train comprising one pulse per sine wave cycle to lead SSS. Normally the pulses on lead SSS are inhibited by a signal on lead SSH. The modulator diphase modulates the signal from lead OCS in accordance with signals from flip-flop A on leads A–0 and A–1 and the output is coupled through a transformer to a two-wire line comprising conductors SL1 and SL2. Normally the modulator is inhibited by a signal on lead SIH. To transmit, the signal on lead SEND is made true which causes the inhibit signals to be removed from the synchronizer and the modulator. The pulses on lead SSS are supplied to the pulse input of the gated pulse amplifier 120 which supplies the A.C. input pulses to the complementary mode flip-flop A; and the pulses on lead SSS are also coupled through a special OR gate 401 to lead MP to the pulse input of gated pulse amplifier 122. With the signal on lead SEND true and flip-flop EOS in the reset condition this gated pulse amplifier 122 is enabled to supply shifting pulses on lead SP to the shift register SR. The signals shifted out of the shift register are coupled via lead BF2–1 to enable the gated pulse amplifier 120 to cause the flip-flop A to change state in response to each bit 1 from the shift register. This causes the output of the modulator to reverse phase in response to each bit 1, and to remain in the preceding phase for each bit 0. When all of the information has been shifted out of the shift register all of its flip-flops are in the reset condition, causing the all zeros signal AZ to become true, which causes the end of send flip-flop EOS to be set on the next pulse on lead SSS, and thereby cutting off the shift pulses from the gated pulse amplifier 122.

The demodulator receives signal on the two-wire line comprising conductors RL1 and RL2, which are coupled through a transformer into the demodulator circuitry. When enabled by a signal on lead REC, the demodulator derives from the incoming signal a train of pulses on lead DP which includes one pulse for each cycle which represents a bit 1 and two pulses for each cycle which represents a bit 0. These pulses are amplified and shaped by a gated pulse amplifier 121 and supplied to lead RP. The pulses from gated pulse amplifier 121 to lead RP are supplied to the demodulator, to an input of the special OR gate 401, and to A.C. inputs of flip-flops D and B. The demodulator includes an integrator circuit which takes the pulses on lead RP and for each bit 1 produces an inverted signal on lead $\overline{S1}$. Flip-flop D is set in response to the first bit 1 in the received signal and remains set until after reception is completed. The signal on lead $\overline{S1}$ is inverted by inverter 105 and supplied to lead S1 and thence via gate 114 to the D.C. set input on lead DCS to the shift register. Flip-flop B is arranged to complement on each pulse on lead RP if the signal on lead S1 is not true, and to reset if S1 is true. The output from flip-flop B is supplied via gate 115 and lead DCR to the D.C. reset input of the shift register SR. Also the signals on lead S1 and the output from flip-flop B are used to control the gated pulse amplifier 122, so that one shift pulse per cycle can be derived from the pulses on lead RP via OR gate 401 to control the shifting of the shift register. At the end of receive, as ascertained by a bit 1 in the prefix of the signal reaching a particular flip-flop of the shift register, the signal EOR becomes true and via gate 112 inhibits gated pulse amplifier 122 from supplying further shift pulses to the shift register. Subsequently the signal on REC becomes false and in response thereto the flip-flops B and D are reset by remote control pulses on lead RCP.

Referring to FIG. 2, the synchronizer 200 includes an oscillator comprising transistor 2Q1 and a buffer amplifier comprising transistors 2Q2 and 2Q3 to supply the basic sine wave signal to lead OCS.

To derive the train of synchronizing pulses from the sine wave signal on lead OCS, the synchronizer includes a buffer amplifier comprising transistors 2Q4 and 2Q5, a class A amplifier comprising transistor 2Q6, an emitter follower amplifier comprising transistor 2Q7, a switching transistor stage comprising a transistor 2Q8 which is either saturated or cut off, a differentiating circuit comprising capacitor 2C14 and resistor 2R21, and a switching stage comprising 2Q9 which shapes the pulses from the differentiating circuit and supplies them to the lead SSS. The lead SSH is connected so that ground signals thereon inhibit the input to transistor 2Q9, maintaining it in its normal saturated condition so that the output is a ground potential.

Referring to FIG. 3, the modulator 300 comprises a buffer amplifier comprising transistors 3Q1 and 3Q2, a switch circuit coupled between transformers 3T1 and 3T2 to turn the modulator on or off under control of the signal on lead SIH, an emitter follower amplifier comprising transistor 3Q4, the modulating circuit coupled between transformer 3T3 and the base electrode of transistor 3Q7 to diphase modulate the sine wave signal under control of the signals on leads A–1 and A–0, and an output amplifier comprising transistors 3Q7, 3Q8 and 3Q9.

Referring to FIG. 4, the demodulator 400 comprises a switching circuit comprising transistors 4Q1 and 4Q2 for short circuiting the demodulator line terminals when not receiving, a low pass filter comprising inductor 4L1 and capacitors 4C1 and 4C2, circuits between transformer 4T2 and lead DP for deriving a train of pulses from the received signal, and an integrator circuit between lead RP and lead $\overline{SI}$; the pulse signals on lead DP being shaped by gated pulse amplifier 121 (FIG. 1) and supplied to lead RP.

The operation of the transceiver will now be described in detail with reference to the circuit, the drawings of FIGS. 1–4, and the graphs in the timing chart of FIG. 5. It should first be noted that the transceiver and shift register are part of a system unit which includes control circuits (which will be referred to as external control circuits) to supply the command signals to the transceiver, and to provide parallel input and output (not shown in FIG. 1) for the shift register. The transceiver provides serial input and output for the shift register, as shown in FIG. 1. The transceiver provides communication with another system unit having a similar transceiver and shift register. Each unit has its own clock to provide control pulses, the clocks of the different units being independent and asynchronous. The oscillator of each transceiver is also independent and asynchronous. The unit in which the transceiver is located supplies pulses from its clock to lead RCP.

Assume that the transceiver has its leads SL1 and RL2 connected via a transmission line to a transceiver in another unit, and that it is to first send and then receive. The external control circuits parallel load the shift register, which causes the all zeros signal AZ to become false. The transmission command on lead SEND then becomes true. These operations by the external control circuits are controlled by the unit clock, and therefore the changes occur asynchronous to the oscillator of synchronizer 200. The signal from lead AZ is supplied to the D.C. set input, and inverted by gate 119 to the D.C. reset input of flip-flop EOS. Since the signal AZ is false, the D.C. reset command of the flip-flop is true.

The signal on lead SEND via inverter 101 supplies a ground signal via lead SSH to the sync circuit which enables it to supply a train of pulses on lead SSS in synchronism with the diphase oscillator. The first SSS pulse at the A.C. reset input of flip-flop EOS insures that that flip-flop is reset. The signal condition (SEND. $\overline{EOS}$) is shown on the timing chart by the graph 5A. The gated pulse amplifier 122 is enabled at its two center inputs by this signal condition, and also a ground potential is supplied from gate 117 via lead SIH to turn on the modulator 300. The modulator switch coupled between the secondary of transformer 3T1 and the primary of transformer 3T2 comprises four diodes 3CR1–4 controlled by a transistor 3Q3. When this transistor is conducting all of the diodes are reverse biased by ground potential through the diodes to the −8 volt source, so that between the transformers 3T1 and 3T2 there appears an open circuit for the A.C. current flow. When the transistor 3Q3 is not conducting current flows between the −16 volts source via current limiting resistor 3R17 and the diodes to the −8 volt supply. Therefore all of the diodes are forward conducting and exhibit a low impedance so that between transformers 3T1 and 3T2 there appears to be a circuit of low impedance in series with the signal. Ordinary switch circuits for alternating current normally generate a disconnect transient when the switch is actuated to the off position. However the switch comprising diodes 3CR1–4 provides an arrangement for shutting off the signal without creating a transient. There is no residual charge, no residual energy of any kind produced on the line by this switch.

Normally transistor 3Q3 is saturated and biases the modulator switch to the nonconducting or off condition. When the signal on lead SIH goes to ground potential, transistor 3Q3 is biased to a nonconducting state, thereby operating the modulator switch to the conducting or on condition.

The synchronizing pulses are supplied from lead SSS via OR gate 401 to lead MP, and thence via gated pulse amplifier 122 to lead SP to the shift register and other circuits. This train of pulses is shown on the timing chart by graph 5B. The information in the shift register is then shifted out under the control of these synchronizing pulses and appears at the output of the least flip-flop of the shift register at lead BF2–1. The state of the last flip-flop BF2 is shown in the timing chart by the Graph 5C. Note that each interval between synchronizing shift pulses represents one bit of information at either level zero or level 1.

A flip-flop A connected in complementary mode has both its A.C. set and reset signals supplied from a gated pulse amplifier 120; and each of the D.C. inputs is supplied from the opposite output of the flip-flop. Therefore each time flip-flop A receives an A.C. pulse from amplifier 120 it will change state. The pulse input signal to amplifier 120 is the train of synchronizing pulses on lead SSS. The two inner inputs of amplifier 120 when true in coincidence supply the D.C. enabling. The signal on lead SEND is true during transmission. The other input is from the last flip-flop of the shift register via lead BF2–1. This signal is delayed by a shunt capacitor DLY, so that each time a bit 1 is shifted out of the shift register, the next synchronizing pulse is supplied via amplifier 120 to the flip-flop A. Therefore flip-flop A changes state each time the information output of the shift register has a value 1, and remains in its previous state each time the shift register output has a value 0, with the flip-flop one cycle behind the shift register output. Graph 5D of the timing chart shows the condition of flip-flop A.

The output of flip-flop A controls the modulating circuit. The modulating circuit comprises a bridge with four resistors 3R17, 3R18, 3R19, and 3R20. The resistors 3R17 and 3R18 are connected respectively to opposite ends of the secondary winding of transformer 3T3, and the center tap of the winding is connected to the −8 volt potential source. The other ends of the resistors 3R17 and 3R18 are connected respectively to transistor switches 3Q5 and 3Q6, and also respectively to the resistors 3R19 and 3R20. The junction of resistors 3R19 and 3R20 are connected to the base electrode of a transistor 3Q7, and also through a capacitor 3C5 to ground. The input circuit of transistor 3Q5 is connected to the output A–1 from flip-flop A, and the input circuit of transistor 3Q6 is connected to the A–0 output of the flip-flop. Therefore one of the two transistors is always conducting and the other is always nonconducting, therefore one phase or the other of the alternating current signal is coupled from transformer 3T3 to transistor 3Q7. Thus when the signal on lead A–1 is true the transistor 3Q5 conducts, and the signal at the upper half of the secondary winding of transformer 3T3 through resistor 3R17 is shunted to ground, while the signal through the lower half of the secondary winding is coupled with the other three resistors acting as a voltage divider to the input of transistor 3Q7. When the signal on lead A–0 is true, transistor 3Q6 conducts so that only the A.C. signal in the upper half winding of the secondary of transformer 3T3 is coupled to transistor 3Q7.

Although flip-flop A changes state under the control of the synchronizing pulses on lead SSS which are derived from the same oscillator which supplies the alternating current input signal to the modulator, there are switching and transmission delays in the circuits and connecting leads. Therefore in the synchronizing circuit 200 the capacitor 2C9 and resistor 2R27 between transformer 2T3 and the input of transistor 2Q6 form a phase shifting network. The resistor 2R27 is adjusted while observing the modulator output signal on an oscilloscope so that the phase reversal in the modulator does occur at precisely the zero crossing. The output from the modulator on the transmission line is shown on the timing chart by the graph 5E. The graphs show that each time a 1 is received from the shift register the flip-flop A changes state on the synchronizing pulse and causes the modulator output signal to reverse phase.

The information from the shift register always includes a prefix 001, followed by any number of information bits, and ending with a suffix 1. The 00 prefix is used because it is not known what sort of residual charge level might be on the transmission line when the alternating current signal is first turned one, and also this permits the signal to be turned on asynchronously with the diphase synchronizing circuit. Sending two zeros allows the alternating current signal to be well established; two whole cycles are sent and if only one of these is received at the other end, that is satisfactory. The 1 following the two zeros of the prefix is really the "Go" signal at the receiving end of the transmission line—this tells the decoding logic that the actual information bits will now follow. The suffix bit 1 serves as a key bit so that the transmitting circuit knows when all zeros are present in the shift register. The all zeros signal is shown on the next Graph 5F on the timing chart, changing from zero to one as the suffix bit is shifted out of the shift register.

With all zeros present in the shift register the signal AZ becomes true and the next synchronizing pulse sets flip-flop EOS. The output of gate 117 then becomes true, and via lead SIH biases transistor 3Q3 into conduction to thereby turn off the modulator switch. The 0 output of flip-flop EOS is delayed by a shunt capacitor DLX, so that the gated pulse amplifier 122 passes the same synchronizing pulse which sets flip-flop EOS, but any subsequent pulses are blocked from reaching lead SP. Note the response on Graphs 5A to 5E, following the signal AZ becoming true on Graph 5F.

The external control circuits respond to the all zeros condition of the shift register to make the signal on lead SEND false, and then provide a true signal on lead REC. The transceiver in the other unit changes from receive to send, and sends signals which will be assumed to be the same as those shown in Graph 5E.

The demodulator 400 is coupled to the transmission line by transformer 4T1. As shown in the transceiver circuits, the demodulator and modulator are connected in series to the transmission line. At the other end of the transmission line there will similarly be connected a modulator and demodulator in series. It is readily apparent that with this arrangement the local modulator must be cut off during reception to keep its signal out of the receiver. However, in addition during transmission it is desirable that the local receiver be shorted out so that its impedance does not appear in series with the modulator. To obtain the short circuit across the demodulator, transistor 4Q1 is connected with its emitter-collector path across the secondary of transformer 4T1. When this transistor is turned on, that is when its base is driven by forward bias at the base-emitter junction, a low impedance conducting path is provided between the collector and emitter terminals. Whenever an alternating current signal appears at transformer 4T1 the transistor conducts and provides an effective short circuit. During reception the control transistor 4Q2 is biased into conduction by a 1 signal on lead REC which causes the base of transistor 4Q2 to be negative, therefore forward biasing the emitter-base junction. This provides a ground potential through transistor 4Q2 and resistor 4R4 to the base of transistor 4Q1, which along with the −8 volt potential at the emitter of transistor 4Q1 reverse biases it into cutoff. Therefore any alternating current signals at transformer 4T1 are passed without appreciable attenuation.

The signal is next passed through a low pass filter comprising capacitors 4C1 and 4C2 and inductor 4L1. This filter is provided with a cutoff frequency approximately one and one-half times the basic diphase oscillator frequency. This filter is used to limit the receiving bandwidth for reducing noise reception, and more importantly to remove from the received waveform the cusp-like discontinuity which occurs at the phase reversal points. This is part of the demodulation process.

In the timing chart, Graph 5G represents the received alternating current waveform at transformer 4T2, after it has been passed through the constant K filter section. Note the difference between this waveform and the one at the output from the modulator to the transmission line as shown in Graph 5E. The cusp-like portion of the waveform has been substantially removed. Removal of this cusp is necessary for the demodulation process because in the following detector and squaring stages this cusp must be definitely above the threshold level to avoid extraneous signals.

The low pass filter is coupled via a transformer 4T2 having a center tap secondary to transistors 4Q3 and 4Q4. These transistors are used as emitter followers which amplify the two halves of the waveform separately. The emitter electrode of transistor 4Q3 is coupled to ground through diode 4CR1 and resistor 4R10, and the emitter electrode of transistor 4Q4 is similarly connected to ground through diode 4CR2 and resistor 4R12. The transistor 4Q3 is responsive only to negative going signals; it acts in effect as a biased detector that half wave rectifies as it amplifies. Similarly the transistor 4Q4 detects as a half wave rectifier on the opposite phase of the received signal. These transistors are followed by squaring stages, the transistor 4Q3 being followed by transistors 4Q5 and 4Q7, and the transistor 4Q4 being followered by transistors 4Q6 and 4Q8. Thus following these stages on each side the signals are square waves representing the two phases of the received signal, one phase being represented by the signal at the collector of transistor 4Q7 and the other phase at the collector of transistor 4Q8. However, these two signals are not complementary, since the detectors are provided with a small amount of thresholding so that they do not respond at the zero crossings but at a potential slightly more negative than zero. Thus the detectors do not responds to small signals which are at a level below the threshold value. Two dashed lines have been shown on Graph 5G, the upper one representing the threshold of the detector circuit comprising transistors 4Q3, 4Q5 and 4Q7 detecting the phase represented by a negative potential at the upper end of the secondary of transformer 4T2 with respect to the center tap; and the lower dashed line representing the threshold of the detector circuit comprising transistors 4Q4, 4Q6 and 4Q8 which detects the phase represented by a negative potential at the lower end of the secondary of transformer 4T2 with respect to the center tap.

The signal at the collector electrode of transistor 4Q7 is shown in Graph 5H. This represents the signal appearing above the upper threshold line in the preceding graph after detection and passage through the squaring amplifiers. Note that the signal is at the negative potential of 1 level whenever the signal at the output of the filter exceeds the upper threshold level. Likewise the signal on the Graph 5I is the signal at the collector electrode of transistor 4Q8 and has a negative or 1 value whenever the lower half of the filter output waveform is below the lower threshold value. Because of the thresholding at the two different levels these signals are not complementary.

The signals are next differentiated, the signal at the collector of transistor 4Q7 being differentiated by capacitor 4C3 and resistor 4R22; while the signal at the collector of transistor 4Q8 is differentiated by capacitor 4C4 and resistor 4R23. Therefore the square wave signals are converted into sharp pulses or spikes with only the negative going spikes being retained. The positive going spikes are shorted to ground by the diodes 4CR5 and 4CR6. Therefore the retained spikes represent the zero to negative going transitions of the square waves.

Next these spike pulses are put together by an OR gate arrangement comprising diodes 4CR7 and 4CR8, and coupled by emitter follower 4Q13 to lead DP. The signals on lead DP are now a train of short pulses at basically twice the alternating current frequency of the diphase signal. However some of the pulses are missing because at each point where there has been a phase reversal one of these pulses has been lost. These signals are coupled through gated pulse amplifier 121 in the transceiver circuit which shapes them and passes them back to demodulator lead RP.

The two Graphs 5J and 5K are the differentiated signals appearing respectively at the cathodes of diodes 4CR7 and 4CR8. These are respectively the differentiated negative going transitions from 0 to 1 of the signals of Graphs 5H and 5I. Note that the negative going transitions of the signal of Graph 5H and the corresponding differentiated signals of Graph 5J occur with some delay after the positive going zero crossings of the filter output signal, and that the negative going transitions of the signal of Graph 5I and the corresponding differentiated signals of Graph 5K occur with approximately the same delay after the negative going zero crossings of the filter output signal, in both cases as determined by the threshold level.

These pulse signals from lead DP are supplied to the pulse input of gated pulse amplifier 121. Note that this gated pulse amplifier is enabled by the receive control signal. The output of gated pulse amplifier 121 is applied to some of the A.C. inputs of flip-flops B and D, and also is supplied to terminal RP of the demodulator. This pulse train is shown on the Graph 5L of the timing chart. The pulses are the differentiated pulses from both halves of the demodulator, shaped and amplified. These pulses are fairly regularly spaced.

The circuit comprising transistors 4Q9, 4Q10 and 4Q11 comprises an integrator network. The next Graph 5M is the signal as it appears at the base electrode of transistor 4Q11. Each time a pulse on lead RP is passed by transistor 4Q9 to the base of transistor 4Q10, the capacitor 4C5 is charged to +8 volts by charge flowing from capacitor 4C6 through the collector-emitter path of transistor 4Q10. Capactior 4C5 discharges through resistors 4R31 and 4R32 to the −16 volts supply source. For a 20-kilocycle diphase signal the integrating circuit is adjusted by resistor 4R32 to discharge to a slightly negative value in approximately 32 microseconds. As long as the pulses on lead RP continue to appear the signal at the base electrode of transistor 4Q11 remains at some positive level. It is only when there is a pulse missing that the capacitor is allowed to discharge, and thereby turn on the transistor 4Q11. The signal as it appears at the collector electrode of transistor 4Q11 is shown in graph 5N. Note that this output signal from transistor 4Q11 appears whenever there is a phase reversal in the diphase signal on the transmission line, representing a bit 1. However this signal is in inverted form and therefore the lead on which it appears is designated $\overline{S1}$. In the transceiver circuit this signal is coupled through an inverting amplifier 105, and the resulting signal is shown by the graph 5O. This is the basic signal for supplying a D.C. "SET 1" signal to the shift register.

Note that the signal S1 is initially true, and remains true until the first pulse RP is produced. If the first clock pulse derived from the signals on lead RP were applied to the shift register along with the signals on lead S1, an undesired 1 would be shifted into the shift register. To avoid this the flip-flop D is provided. This flip-flop is set by the second pulse on lead RP and the D.C. signal $\overline{S1}$. The output 1 from flip-flop D is supplied to gates 112 and 114. After the flip-flop D has been set, the next time the signal on lead S1 at the output of inverter 105 becomes true a 1 will be shifted into the shift register. The output from gate 114 is connected via lead DCS to the D.C. set input of the first flip-flop of the shift register.

The pulses on lead RP are gated via OR gate 401 to lead MP, and thence to the pulse input of gated pulse amplifier 122. The first 1, which is part of the prefix of the received signal, causes the integrator capacitor 4C5 to discharge to the point of turning transistor 4Q11 on and via inverter 105 produces a true signal on lead S1. This signal via OR gate 111 and AND gate 112 enables gated pulse amplifier 122. Therefore a pulse is supplied via lead SP to the shift register, and since before the appearance of this shift pulse the signal on lead S1 has via gate 114 supplied an enabling signal to lead DCS, a bit 1 is supplied to the shift register. This causes the all zeros signal AZ to become false, thereby removing an inhibiting condition from gate 107. This signal condition (REC $\overline{\text{ALL Z}}$) is shown on graph 5Q. The zeros in the prefix which have occurred before this signal condition became true are discarded.

Flip-flop B is provided to supply the set zero signal via OR gate 115 to the lead DCR to the shift register. The flip-flop is arranged to complement on each occurrence of the pulse on lead RP if the signal on lead S1 is not true, and to reset if signal S1 is true. Thus the lead RP is connected to the A.C. input leads at the outer inputs of flip-flop B. The D.C. set input is supplied from gate 107 which with the signal REC true and AZ false is enabled to supply a 1 each time the flip-flop B is in the reset condition and the signal S1 is not true. The D.C. reset input at the lower reset input gate becomes true via OR gate 109 each time the flip-flop B is in the set condition or signal S1 is true. Thus each time a bit 0 occurs in the incoming signals two pulses on lead RP are produced; and flip-flop B is set on the first of these pulses and reset on the second. Each time a bit 1 occurs in the incoming signal, only one pulse is produced on lead RP, and this pulse in conjunction with the true signal on lead S1 insures that flip-flop B is reset. The condition of flip-flop B is shown by the Graph 5R.

The flip-flop output B–1 is applied through a series diode and, delayed by a shunt capacitor DLZ, is supplied to lead BD. This delayed signal is shown by the Graph 5S. The delay permits this signal to be used to select only the second of two RP pulses for each bit 0 in the incoming signal. The signal condition (S1+BD) from gate 111 is supplied via gate 112 to enable the gated pulse amplifier 122 so that for each information bit in the received signal (one complete cycle of the basic diphase oscillator) one and only one shift pulse is supplied from the lead RP through the amplifier 122 to lead SP. These pulses are shown on the timing chart by the Graph 5T. This is a shift clock pulse train having the same repetition rate as the shift pulse train SSS at the sending end, shown by Graph 5B.

The Graph 5U represents the condition of the first flip-flop in the shift register, showing the pattern 1011001 being received. When the 1 of the prefix reaches the flip-flop PF (not shown in FIG. 1) of the shift register, the end-of-receive signal EOR becomes true and inhibits gate 112 so that no more shift pulses can be supplied to the shift register.

When the external control circuits make signal REC false, the control pulses on lead RCP reset flip-flops B and D.

The value of the components in FIGS. 1–4 for operation at 20 kilocycles are as given in said Wedmore patent application.

*Noise cancellation*

If there is noise on the transmission line such as voltage spikes induced by relay switching in adjacent circuits, these may appear as information bits during reception and prematurely set the flip-flops D and B before actual signals are received. Attempts to avoid the effect of these spikes, such as diodes on the relays causing them, have helped in particular cases but the reliability at times was doubtful.

The solution to this problem is to add a second integrator circuit as shown in FIG. 4. The main integrator comprising transistors 4Q9, 4Q10 and 4Q11 receives the pulse signals on lead RP and produces the signal $\overline{S1}$. When the diphase oscillator signal is at 20 kilocycles, this integrator produces an A1 signal when the time between two pulses on lead RP is greater than approximately 32 microseconds, which is the case when a bit 1 is received.

The second integrator is similar to the first and comprises transistors 6Q9, 6Q10 and 6Q11 and also has its input received from lead RP, and the output from the collector of transistor 6Q11 is designated $\overline{RS}$. This integrator is adjusted to produce a signal RS when the time between two pulses on lead RP exceeds approximately 60 microseconds.

Voltage spikes caused by switching noise have a very irregular appearance. While the noise pulses cannot be distinguished from information signals by their amplitude, a well detectable difference exists in the frequency or repetition rate. The diphase information produces pulses on lead RP at a relatively stable repetition rate of 40 kilocycles. Switching noise produces pulses on lead RP at a very irregular rate. Thus if the time between two adjacent pulses on lead RP exceeds approximately 60 microseconds, this signifies either that "end of receive" is true, or that noise has occurred during the time preceding the arrival of information signals. In this latter case the signal on lead EOR remains false, and the signal RS may be used to reset the flip-flops D and B and the shift register, so that when the actual information signals arrive the receive circuit will be in the proper condition to serially load the shift register correctly.

Automatic reset of the flip-flops B, D and the shift register is thus to be provided when the RS signal appears and when "end of receive" is not true. This will insure that the reset occurs only when the RS pulse is caused by noise pulses. The Boolean expression for providing the reset command is thus ($RS.REC.\overline{EOR}.D$) as provided by gate 610. The signal from gate 610 via OR gate 612 is applied to the D.C. reset inputs of the flip-flops D and B so that they are reset by the A.C. pulses on lead RCP. The output of gate 610 also enables a gated pulse amplifier 611 to gate the pulses on lead RCP to reset the shift register.

While FIG. 4 shows the additional integrator 6Q9, 6Q10, 6Q11 to be completely separate from the integrator 4Q9, 4Q10, 4Q11, some of the circuits may be used in common. For example the transistor 4Q9 may be common and the transistors 4Q10 and 6Q10 have their base electrodes connected in parallel to the output of transistor 6Q9. Another arrangement which has been found effective is to provide the transistors 4Q9, and 4Q10 and the collector circuit of transistor 4Q10 in common and to provide parallel connections from the emitter electrode of transistor 4Q10 using diodes to isolate the two capacitors 4C5 and 6C5 and their discharge circuits from each other.

Thus with the additional integrator circuit an arrangement is provided such that during the wait time between the actuation of the receiver by making the signal REC true and the arrival of the first information bits which may be several milliseconds later, if any noise pulses cause actuation of the receiving circuits they are automatically reset so that they will be in the proper condition when the actual information signals arrive. Resistors 6R31 and 6R32 have values of 90,000 ohms and 20,000 ohms respectively.

The manner in which the arrangement of FIG. 1 is incorporated into a telephone system is disclosed in said Wedmore patent application.

While I have described above the principles of my invention in connection with specific apparatus, it is to be clearly understood that this description is made only by way of example and not as a limitation to the scope of my invention.

What is claimed is:

1. In a system for demodulating a received carrier signal which is phase shift modulated by data in a binary system of notation, in which each cycle at the carrier frequency represents a binary digit, a first binary value being represented by a phase reversal at the beginning of a cycle, and a second binary value being represented by the same phase as the preceding cycle;

the combination comprising a low pass filter having a cut off frequency substantially above the carrier frequency for removing the components of the signal at said phase reversal points which fall between the zero amplitude level and a given threshold level;

an arrangement including squaring and differentiating means coupled to the output of the filter to derive a pulse for each of the zero crossings of the received signals, whereby for each binary digit of the first value there is one pulse produced and for each binary digit of the second value there are two pulses produced;

first integrating means coupled to said arrangement for measuring the time between said pulses to produce a first signal only when the time between said pulses is more than one-half cycle at said carrier frequency, whereby said first signal is produced in response to each binary digit of the first value;

means coupled to the output of said arrangement and the output of said integrating means to derive a second signal during each cycle in which said first signal is not produced, whereby the second signal represents a received binary digit of the second value;

gating means coupled to the outputs of said arrangement, said integrating means, and said means for deriving a second signal to select from the output of said arrangement one pulse per cycle, thereby producing a timing pulse train having one pulse per binary digit;

a register having a timing control input coupled to the output of said gating means, a first set input coupled to the output of said integrating means, and a second set coupled to the output of said means for deriving a second signal, whereby data corresponding to the binary data in said received signals is serially stored in the register;

second integrating means coupled to said arrangement for measuring the time between said pulses to produce a reset signal only when the time between said pulses is more than one cycle at said carrier frequency, and means responsive to said reset signal to reset said register.

2. In a demodulating system, the combination as claimed in claim 1, wherein said means to derive a second signal comprises a bistable device connected to be set to a first state in response to the first of said two pulses produced for each binary digit of the second value and to be set to its second state in response to the second of these two pulses, and wherein said device is connected to remain in its second state for each binary digit of the first value as represented by there being only one pulse during the cycle;

a second bistable device coupled to the output of said arrangement and of said first integrating means to be set to a first state in response to the presence of pulses at the output of said arrangement and the initial appearance of said first signal from the output of said integrating means, and wherein said coupling between the said first set input of the register and the output of said integrating means includes gate means having a connection to said second bistable device to prevent supplying a signal to the first set input of the register before the carrier signal is received, and wherein the second device is connected to remain in its first state until after reception is completed, and means effective after the completion of reception to set both of said bistable devices to their second states;

and wherein said means responsive to said reset signal includes means to reset both of said bistable devices.

3. In a demodulating system, the combination as claimed in claim 2, wherein said arrangement to derive a pulse for each of the zero crossings of the received signals comprises means to detect levels exceeding said given threshold level in both the positive and negative direction of the signal waveform as it appears at the output of said filter, means for squaring the detected signals, and differentiating means to produce pulses for transitions of the square wave in one direction and preventing the production of pulses for transitions in the other direction;

and wherein each of said integrating means includes a transistor having base, emitter, and collector electrodes, with an input at its base electrode, a circuit including a capacitor connected to its collector electrode, and a circuit including a capacitor and a discharge resistor connected to its emitter electrode, arranged to respond to each pulse from the output of said arrangement to transfer charge from the collector circuit capacitor to the emitter circuit capacitor, and to discharge during the interval between pulses, and a switching device connected to said emitter circuit to produce said first signal in response to discharge of the emitted circuit capacitor to a given level, the discharge time from the last received pulse being determined to be greater than a half cycle and less than one full cycle for the first integrating means, and in the second integrating means the discharge time being determined to be greater than one full cycle, to cause said reset signal to be produced.

4. In a demodulating system, the combination as claimed in claim 1, wherein each said integrating means includes a transistor having base, emitter, and collector electrodes, with an input at its base electrode, a circuit including a capacitor connected to its collector electrode, and a circuit including a capacitor and a discharge resistor connected to its emitter electrode, arranged to respond to each pulse from the output of said arrangement to transfer charge from the collector circuit capacitor to the emitter circuit capacitor, and to discharge during the interval between pulses, and a switching device connected to said emitter circuit to produce said first signal in response to discharge of the emitter circuit capacitor to a given level, the discharge time from the last received pulse being determined to be greater than a half cycle and less than one full cycle for the first integrating means, and in the second integrating means the discharge time being determined to be greater than one full cycle to cause said reset signal to be produced.

5. In a system for demodulating a received carrier signal which is phase shift modulated by data in a binary system of notation, in which each cycle at the carrier frequency represents a binary digit, a first binary value being represented by a phase reversal at the beginning of a cycle, and a second binary value being represented by the same phase as the preceding cycle;

the combination comprising first means to remove the components of the signal at said phase reversal points which fall between the zero amplitude level and a given threshold level;

second means coupled to the output of said first means to derive a pulse for each of the zero crossings of the signal, whereby for each binary digit of the first value there is one pulse produced and for each binary digit of the second value there are two pulses produced;

third means coupled to said second means to measure the time between said pulses to produce a first signal only when the time between said pulses is more than one-half cycle at said carrier frequency, whereby said first signal is produced in response to each binary digit of the first value;

fourth means coupled to the outputs of said second and third means to derive a second signal during each cycle in which said first signal is not produced, whereby the second signal represents a received binary digit of the second value;

gating means coupled to the outputs of said second, third and fourth means to select from the output of said second means one pulse per cycle, thereby producing a timing pulse train having one pulse per binary digit;

a register having a timing control input coupled to the output of said gating means, a first set input coupled to the output of said third means, and a second set input coupled to the output of said fourth means whereby data corresponding to the binary data in said received signals is serially stored in the register;

reset means coupled to said second means to measure the time between said pulses to produce a reset signal only when the time between said pulses is more than one cycle at said carrier frequency, and means responsive to said reset signal to reset said register.

References Cited

UNITED STATES PATENTS

| | | | |
|---|---|---|---|
| 3,032,745 | 5/1962 | Hamer ------------ | 178—66 X |
| 3,156,893 | 11/1964 | Harel. | |
| 3,159,793 | 12/1964 | Welsh. | |
| 3,215,779 | 11/1965 | Halm et al. ---------- | 178—67 |

JOHN W. CALDWELL, *Acting Primary Examiner.*

J. T. STRATMAN, *Assistant Examiner.*